(12) United States Patent
Woo et al.

(10) Patent No.: US 11,660,744 B2
(45) Date of Patent: May 30, 2023

(54) MODULE-TYPE ROBOT CONTROL SYSTEM

(71) Applicant: KOREA INSTITUTE OF SCIENCE AND TECHNOLOGY, Seoul (KR)

(72) Inventors: Deok Ha Woo, Seoul (KR); Sehyuk Yim, Seoul (KR); Jaeyong An, Seoul (KR); Junhyeok Oh, Seoul (KR); Dongyeon Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 107 days.

(21) Appl. No.: 17/204,946

(22) Filed: Mar. 18, 2021

(65) Prior Publication Data
US 2021/0299857 A1  Sep. 30, 2021

(30) Foreign Application Priority Data
Mar. 25, 2020  (KR) .................. 10-2020-0036172

(51) Int. Cl.
*B25J 9/16* (2006.01)
*B25J 9/08* (2006.01)
*B25J 9/00* (2006.01)

(52) U.S. Cl.
CPC .............. *B25J 9/08* (2013.01); *B25J 9/0009* (2013.01); *B25J 9/1689* (2013.01); *G05B 2219/40304* (2013.01)

(58) Field of Classification Search
CPC ... B25J 9/009; B25J 9/08; B25J 9/1689; B25J 5/007; G05B 2219/40304
See application file for complete search history.

(56) References Cited

U.S. PATENT DOCUMENTS

| | | | |
|---|---|---|---|
| 2003/0040250 A1* | 2/2003 | Yim | B25J 9/1617 446/91 |
| 2012/0122059 A1* | 5/2012 | Schweikardt | G09B 1/36 434/118 |
| 2014/0342834 A1* | 11/2014 | Tappeiner | A63F 13/00 463/42 |
| 2015/0364060 A1* | 12/2015 | Gupta | B25J 13/06 434/118 |
| 2016/0151909 A1* | 6/2016 | Hardouin | B25J 9/08 700/245 |

(Continued)

FOREIGN PATENT DOCUMENTS

KR  1020130017520 A  2/2013
KR  101546927 B1  8/2015

(Continued)

*Primary Examiner* — Dale Moyer
(74) *Attorney, Agent, or Firm* — Cantor Colburn LLP (57) ABSTRACT

The present disclosure relates to a module-type robot control system comprising: a robot platform including a driving unit which is driven by a control signal, at least one function block which is assemblable and disassemblable on the robot platform and configured to perform a specific function, and a user terminal capable of wirelessly communicating with the robot platform and the function block. According to the system. The user may remotely control the module-type robot through a smart device, or receive related content by receiving data from the robot through the terminal. The user may easily control the robot or receive more diverse customized contents by connection between the smart device and the module-type robot system.

8 Claims, 7 Drawing Sheets

(56) References Cited

U.S. PATENT DOCUMENTS

| | | | | |
|---|---|---|---|---|
| 2016/0184993 A1* | 6/2016 | Brandwijk | ............... | B25J 9/101 |
| | | | | 463/31 |
| 2017/0004730 A1 | 1/2017 | Kim | | |
| 2017/0288976 A1* | 10/2017 | Wang | .................... | H04L 9/0816 |
| 2018/0353871 A1* | 12/2018 | Oschuetz | ................... | B25J 9/08 |
| 2020/0009741 A1* | 1/2020 | Han | ......................... | B25J 13/06 |
| 2020/0254623 A1 | 8/2020 | Eun et al. | | |

FOREIGN PATENT DOCUMENTS

| KR | 20-2016-0000841 U | 3/2016 |
|---|---|---|
| KR | 10-1881694 B1 | 7/2018 |
| KR | 101978115 B1 | 5/2019 |
| KR | 1020190088787 A | 7/2019 |
| KR | 10-2019-0100696 A | 8/2019 |
| KR | 1020190143545 A | 12/2019 |
| KR | 102069794 B1 | 1/2020 |
| KR | 10-2020-0013581 A | 2/2020 |

\* cited by examiner

MODULE-TYPE ROBOT CONTROL SYSTEM

CROSS-REFERENCE TO RELATED APPLICATION

This application claims priority to Korean Patent Application No. 10-2020-0036172, filed on Mar. 25, 2020, and all the benefits accruing therefrom under 35 U.S.C. § 119, the contents of which in its entirety are herein incorporated by reference.

BACKGROUND

1. Field

The present disclosure relates to a module-type robot including a robot platform and function blocks which are assemblable on the robot platform, and further, a system for controlling the module-type robot through a smart device.

2. Description of the Related Art

Robotic toys are powered through power sources and perform predefined operations. As opposed to non-moveable toys, robotic toys are easy to attract users' attention, but most of them simply repeat the predefined operations, so the users are highly likely to lose interest. Assemblable module-type robots, for example, robots in which cubes of various shapes can be assembled or disassembled to form an arbitrary shape, allow users to assemble or design the components as desired, and thus keep the users interested and hold their attention.

However, most of commercially available module-type robots do not allow users to arbitrarily set the functions of each module, and the users are only allowed to perform the functions initially set by manufacturers, which places limitations on the configuration and combination of the components. Additionally, in many cases, the module-type robots do not have connection functions with smart devices such as smartphones or tablet PCs, resulting in limited use.

SUMMARY

The present disclosure is directed to providing a module-type robot which is designed in a block shape to be freely assembled, and can implement a user's desired function or create customized content by controlling each component through a smart device, and its control system.

A module-type robot control system according to an embodiment of the present disclosure includes a robot platform including a driving unit which is driven by a control signal, at least one function block which is assemblable and disassemblable on the robot platform and configured to perform a specific function, and a user terminal capable of wirelessly communicating with the robot platform and the function block, wherein each function block includes a power source unit for receiving power, a wireless communication unit for wirelessly communicating with an external device, and a storage unit to store firmware for performing the specific function.

According to an embodiment, each function block may be a control function block configured to transmit the control signal to the robot platform or the other function block by a user's manipulation, or an output function block configured to perform an output function when receiving the control signal from the control function block or the user terminal.

According to an embodiment, the control function block may include an input unit for generating an input signal by the user's manipulation, and the control function block may be configured to generate the control signal for driving the driving unit of the robot platform or controlling the operation of the output function block according to the input signal, and transmit the control signal to the robot platform or the output function block through the wireless communication unit.

According to an embodiment, the output function block may include an output unit including at least one output device of a light-emitting diode, a speaker or a display, and the output function block may be configured to receive the control signal from the control function block or the user terminal and operate the output device.

According to an embodiment, the user terminal may be configured to receive information associated with the robot platform or the function block from the robot platform or the function block, and the user terminal may include a display and may be configured to output the received information onto the display.

According to an embodiment, the information received by the user terminal may include information associated with an assembly structure or a task status of the robot platform and the function block, and the user terminal may be configured to output content related to the information onto the display.

According to an embodiment, the user terminal may be configured to provide to user customized content by combining the received information with pre-stored user information.

According to an embodiment, the firmware for performing the specific function of the function block may be altered to perform a function that is different from the specific function.

According to an embodiment of the present disclosure, there is provided a module-type robot including a robot platform serving as a base for assembling and function blocks which are assemblable on the robot platform. A user may implement a customized robot by freely coupling or decoupling the function blocks that perform specific functions to/from the robot platform. The function blocks according to an embodiment may perform an operation by the execution of the stored firmware, and the firmware may be arbitrarily altered by the user, so even the same block may be set to perform a variety of functions.

The user may remotely control the module-type robot through a terminal, for example, a smartphone, or receive related content by receiving data from the robot through the terminal. The user may easily control the robot or receive more diverse customized contents by connection between the smart device and the module-type robot system.

Accordingly, there is provided the module-type robot that implements a variety of functions according to the modules based on the smart toy platform. The user may construct the robot of a desired shape using the modules of necessary functions, and perform a variety of functions using information between the modules. The module-type robot of an embodiment may be controlled through the terminal such as a smartphone, a tablet PC and a computer via wireless communication, and provides a variety of practical tasks or entertainment effects.

DETAILED DESCRIPTION

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be defined based on the meaning of the terms and the context throughout the specification, rather than simply the name of the terms.

Additionally, the embodiment described herein may have aspects of entirely hardware, partly hardware and partly software, or entirely software. The term "unit", "module", "device" or "system" as used herein refers to computer related entity such as hardware, hardware and software in combination, or software. For example, the unit, module, device, server or system may refer to hardware that makes up a platform in part or in whole and/or software such as an application for operating the hardware.

Hereinafter, the embodiments are described in detail with reference to the accompanying drawings and the matter described in the accompanying drawings, but the claimed scope is not restricted or limited by the embodiments.

Figure 1:
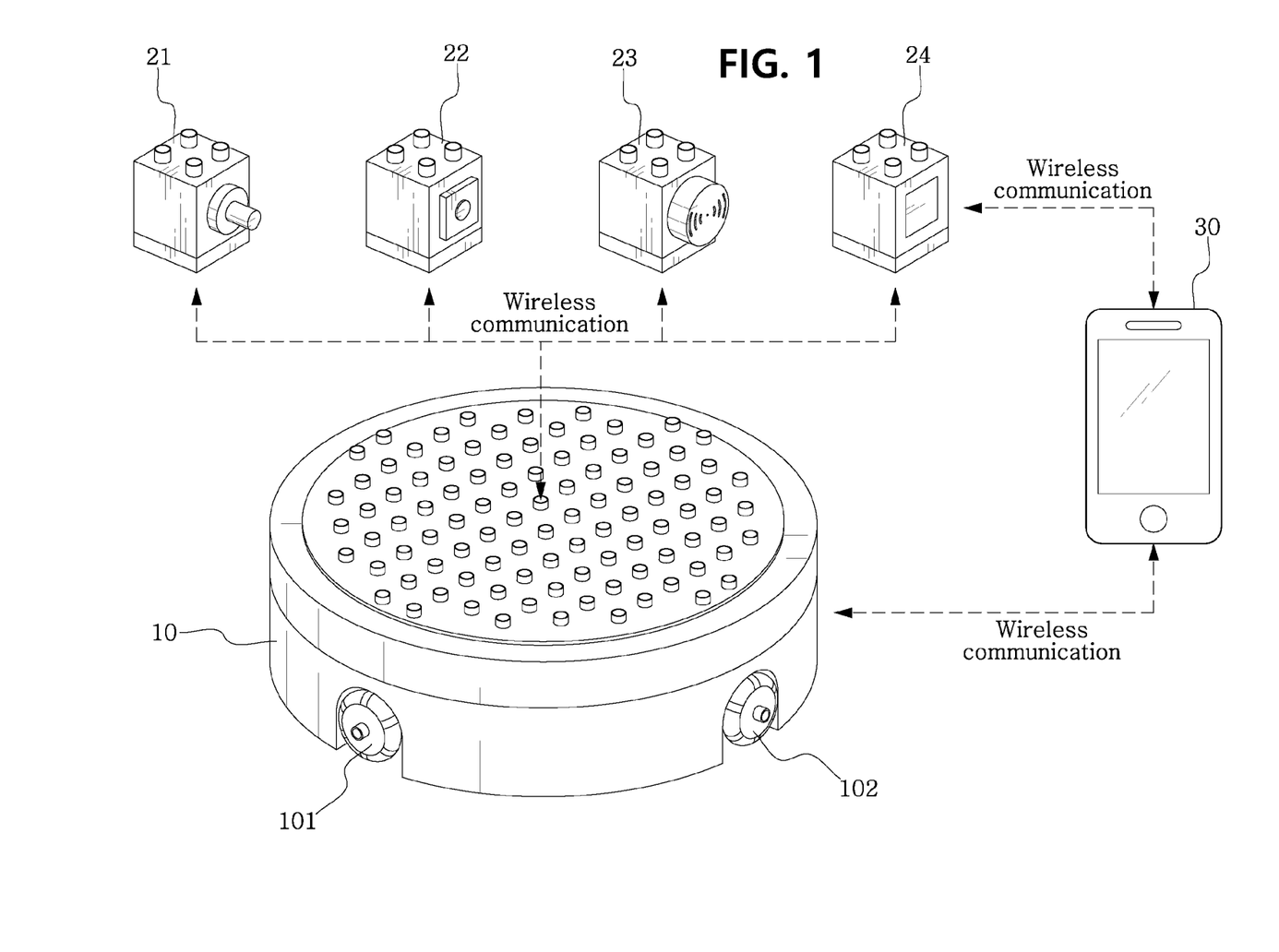
FIG. 1 shows an architecture diagram representing the architecture of a module-type robot control system according to an embodiment.

FIG. 1 shows the architecture of a module-type robot control system according to an embodiment. Referring to FIG. 1, the module-type robot control system according to an embodiment includes a robot platform 10 equipped with driving units 101, 102, at least one function block 21, 22, 23, 24, and a user terminal 30 capable of wirelessly communicating with the robot platform and the function blocks.

The robot platform 10 is a component that serves as a base of a module-type robot. According to an embodiment, as shown in FIG. 1, the robot platform 10 may include the wheel-type driving units 101, 102 that are rotated by a motor. Each driving unit 101, 102 has one side coupled to the motor and the opposite side coupled to a wheel in contact with the ground. The motor coupled to the driving units 101, 102 is supplied with power from a power source unit and rotates according to a control signal. For example, when the driving units 101, 102 rotate in the same direction, the robot platform body may move forward or backward, and when the driving units 101, 102 rotate in different directions, the robot platform body may rotate in the left or right direction. The shape or number of driving units shown is provided for illustration purposes to help understanding, and the driving units may be formed in various shapes or numbers. For example, the driving units may include 4 wheels, and may include propellers for drones to lift the robot platform into the air.

Figure 2:
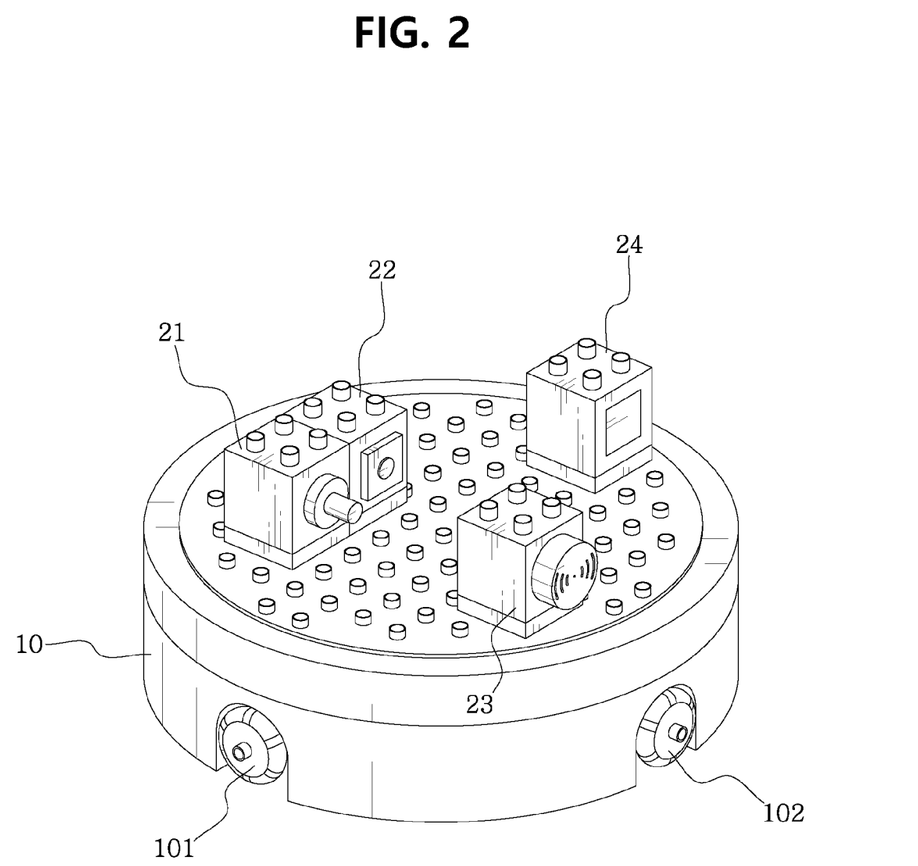
FIG. 2 shows function blocks assembled on a robot platform according to an embodiment.

A user may determine the shape and function of the robot by assembling or disassembling the function blocks that perform specific functions on the robot platform. According to an embodiment, a plurality of protrusions and recesses is formed on the robot platform 10 at a predetermined interval as shown in FIGS. 1 and 2. In an embodiment, a housing of the function blocks 21-24 may have a hexagonal shape, and the hexagon may have, on at least one surface, protrusions and recesses that can be interlocked with the protrusions and recesses of the robot platform, and may be coupled or decoupled to/from the top of the robot platform. This coupling type is provided for illustration purposes and is not limited to a particular type. Various types of assembly structures may be used, and for example, magnets of different polarities may be embedded on the top of the robot platform and one surface of the function blocks to easily attach and detach the function blocks to/from the robot platform.

The robot platform 10 includes a wireless communication unit to wirelessly communicate with an external device (the function block or the terminal such as a smartphone). As described below, the robot platform 10 may act as a hub to receive a control signal from the function block and drive the driving units 101, 102, or receive data related to each block and transmit the data to the user terminal 30, for example, a smartphone.

Each function block 21, 22, 23, 24 performs a specific function. The function blocks have a wireless communication code that can be identified for each individual function block to wirelessly transmit and receive the signal to/from the paired blocks or the robot platform. The task status (ON/OFF, pairing/unpairing with the other block, etc.) of each block may be monitored through the terminal, for example, a smartphone.

Each function block may be a control function block to transmit the control signal to the robot platform or the other function block by the user's manipulation, or an output function block configured to perform an output function when receiving the control signal from the control function block or the user terminal. Alternatively, the function blocks may be a combined function block having both the external device control function and the output function.

In the example of FIGS. 1 and 2, the function blocks 21, 22 correspond to the control function block, and the function blocks 23, 24 correspond to the output function block. The function blocks shown in FIGS. 1 and 2 are provided for illustration purposes to help understanding, and the detailed specifications of the function blocks such as the shape or number may be different depending on the embodiments.

Figure 3:
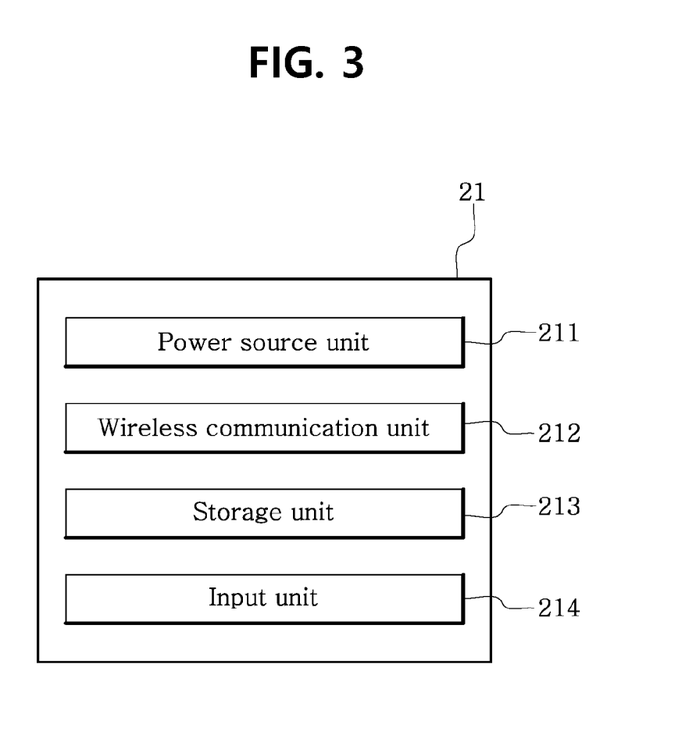
FIG. 3 shows a block diagram representing a configuration of a control function block according to an embodiment.
Figure 4:
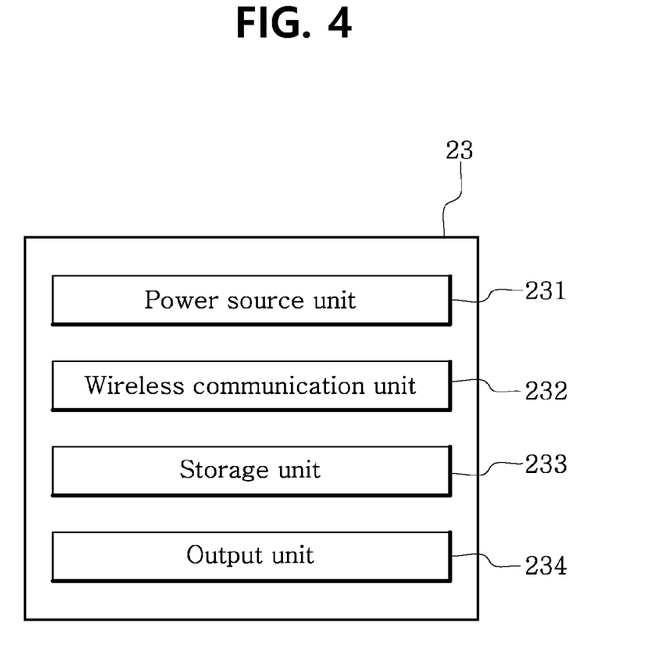
FIG. 4 shows a block diagram representing a configuration of an output function block according to an embodiment.

FIG. 3 shows a configuration of the control function block according to an embodiment, and FIG. 4 shows an exemplary configuration of the output function block according to an embodiment. Each function block includes, in common, a power source unit for receiving power, a wireless communication unit for wirelessly communicating with an external device, and a storage unit to store firmware for performing a specific function. This is a list of essential components to perform the specific functions set for the blocks, and although not described in detail, the function blocks may further include components necessary to perform the given functions.

Referring to FIG. 3, the control function block 21 according to an embodiment includes a power source unit 211, a wireless communication unit 212, a storage unit 213 and an input unit 214. The power source unit 211 is a device for supplying power to the component of the control function block 21. For example, power supply may be performed from a battery embedded in the function block or another device (for example, a battery of the robot platform or domestic direct current (DC) power) wiredly connected to the function block.

The wireless communication unit 212 is a device for wirelessly transmitting and receiving data to/from an external device, for example, the other function block, the robot platform, or the terminal such as a smartphone. The wireless communication method is not limited to a particular type, and may include, for example, wireless communication techniques such as Wi-Fi, near-field communication (NFC), Bluetooth and radio-frequency identification (RFID). The control function block 21 may transmit a control signal to another device through the wireless communication unit 212, for example, to allow the output function blocks 23, 24 to perform an output function, operate the driving units 101, 102 of the robot platform 10, or transmit and receive data to/from the user terminal 30.

The storage unit 213 stores firmware for performing the specific function of each block. The storage unit 213 may include a memory device such as Read Only Memory (ROM) and Random Access Memory (RAM) or a combination thereof, according to the purpose of use. The firmware is a microprogram for controlling hardware, and includes instructions for performing the specific function to implement through each function block. In an example, the firmware of the control function block generates a control signal for rotating the motor connected to the driving units of the robot platform or controlling the rotational speed by the user's manipulation (press a switch, touch a touchscreen, rotate a lever, etc.) and transmits the control signal to the robot platform. In another example, the firmware of the output function block is configured to control the brightness of a light-emitting diode (LED), output a voice through a speaker or output an image to a display according to the control signal inputted from the external device. As described above, the firmware stored in the storage unit implements the specific function by operating each hardware device provided in the function block.

The input unit 214 is a component for generating an input signal by the user's manipulation. The input unit 214 may include an input device of a suitable type for the purpose of use of each function block, for example, a switch for powering ON/OFF the other function block or the robot platform, and a voltage regulator (VR) for controlling the voltage of the output device or the rotational speed of the motor for driving the robot platform.

Figure 5:
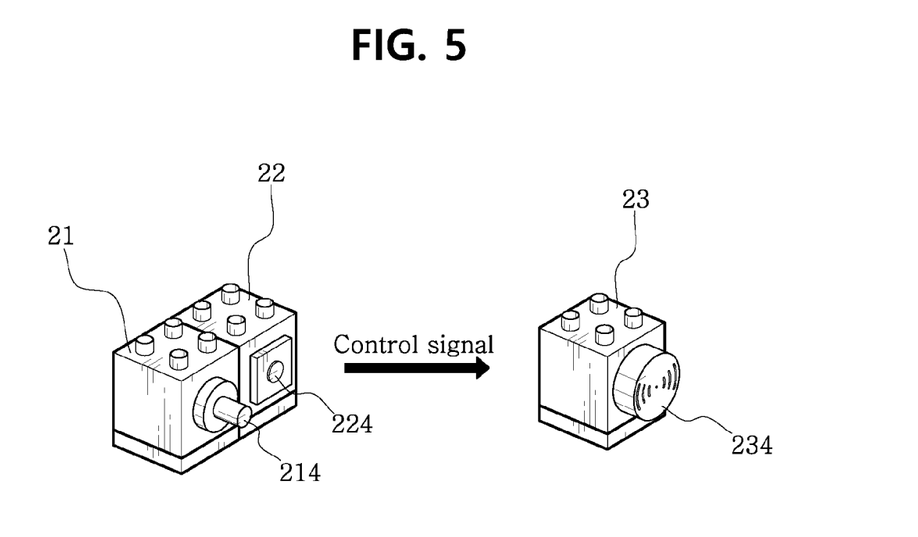
FIG. 5 shows assembly and function execution of function blocks according to an embodiment.

FIG. 5 shows the assembly and function execution of the function blocks according to an embodiment. Referring to FIG. 5, the control function block 21 has a voltage regulator 214 as the input unit, and the control function block 22 has a switch 224 as the input unit. When the user presses the switch 224, a control signal is transmitted to the output function block 23 through the wireless communication unit, and the output function block 23 executes a command (for example, powering on a speaker 234 or changing to a different mode) corresponding to the corresponding control signal. When the user manipulates the voltage regulator 214 (for example, rotating in the clockwise direction), a corresponding control signal is transmitted to the output function block 23, and a command (for example, increasing the volume of the speaker 234) corresponding to the corresponding control signal is executed.

In another example, the input unit 214 may include the input device such as a microphone to receive input of a voice command from the user, or a touchscreen to generate a control signal in response to the pressure. The input device may be differently configured depending on the function and objective to achieve using the block, and as described below, the user may add or reset through settings.

FIG. 4 shows an exemplary configuration of the output function block according to an embodiment. Referring to FIG. 4, the output function block 23 according to an embodiment includes a power source unit 231, a wireless communication unit 232, a storage unit 233 and an output unit 234. The functions and roles of the power source unit 231, the wireless communication unit 232 and the storage unit 233 are similar to those of the control function block described with reference to FIG. 3 and redundant descriptions are omitted herein. The firmware of the output function block 23 includes a program for operating the output unit 234.

The output unit 234 includes, for example, an output device such as an LED, a speaker and a display. According to the control signal, the LED may output light, the speaker may output a voice file pre-stored in the storage unit 233 or a voice inputted through the external device, and the display may output an image (for example, a figure, an emoticon, a picture, etc.) pre-stored in the storage unit 233 or received from the external device. The configuration of the output device is provided for illustration purposes only and a variety of output devices may be used according to functions and objectives to achieve. For example, the output function block may include an imaging device such as a camera to implement the function of acquiring an image according to the control signal.

As described above with reference to FIG. 5, the user inputs a control command through the control function blocks 21, 22, and the generated control signal is transmitted through the wireless communication unit of each function block. The output device of the output function block 23, for example, the speaker, outputs a voice according to the control signal. The voice file may be pre-stored in the storage unit 233 of the output function block 23, and may be inputted through the input device (e.g., a microphone) of the other block.

Figure 6:
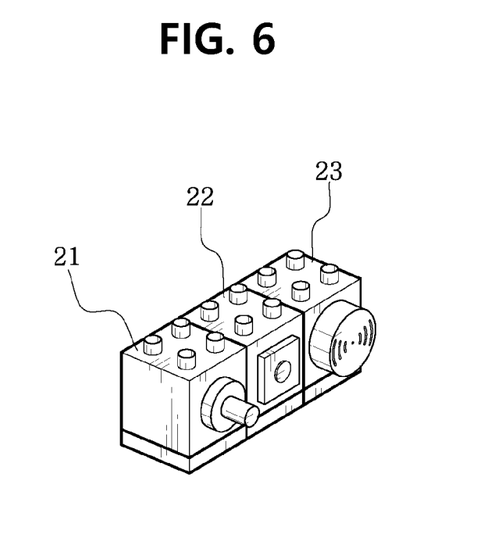
FIG. 6 shows assembly and function execution of function blocks according to another embodiment.

FIG. 6 shows the assembly and function execution of the function blocks according to another embodiment. As shown in FIG. 6, the assembly of the control function blocks 21, 22 and the output function block 23 may be configured to perform a different function from the assembly of FIG. 5. The output function block 23 may be set to output a voice prompt such as "Function 1 has been generated" and "Function 2 has been generated" according to each combination.

Referring back to FIG. 1, the user terminal 30 is a device capable of wirelessly communicating with the robot platform 10 and the function blocks 21-24, and is a component for controlling the device or receiving data from the device and providing related content to the user. The user terminal 30 refers to any type of electronic device (for example, a smartphone, a tablet PC, a desktop computer, a laptop computer, etc.) including an input device (a keyboard, a mouse, a touchscreen, etc.), an output device (a display, a speaker, etc.), and a processing device for data processing (a processor, for example, a central processing unit (CPU)).

According to an embodiment, the user terminal 30 receives information associated with the robot platform 10 or the function blocks 21-24, for example, information associated with real-time task status of the robot platform or the function block (the movement speed and direction of the robot, whether the function of each block is performed or not, etc.) or their connection structure (which of the function blocks are coupled to the robot platform) via wireless communication. The terminal may output the corresponding information or its related content onto the display.

The content may include images and moving images related to the function or connection structure of the robot, and may be pre-stored in a storage device of the terminal. According to an embodiment, the content may be differently provided depending on the user's age, gender and purpose of use (for example, for education or for fun). That is, it is possible to simply display the information received from the module-type robot as well as provide customized content by combining with pre-stored user information (the user's age, gender, purpose of use, preference, etc.). Accordingly, as opposed to the existing module-type robot toys that only perform the predefined functions, it is possible to use for educational purposes and provide different customized contents depending on users even through the same module is used.

In another embodiment, when the wirelessly connected smart device is not detected, the module-type robot may be configured to provide the related information or content by itself, for example, through the display provided in the output function block. Accordingly, the module-type robot does not need to connect to the smart device, and may be completely implemented through the control function and the output function performed by the function blocks.

According to an embodiment, the firmware for performing the specific function of each function block (for example, the control function block's function of controlling other block or outputting an image of the output function block) may be altered to perform other functions. For example, in case that the regulator of the control function block is set to control the volume of the speaker of the output function block when manipulated, the regulator may be reset to control the rotational speed of the motor of the robot platform when manipulated. The user may reset the control function block through the external terminal such as a computer or a smartphone.

Figure 7:
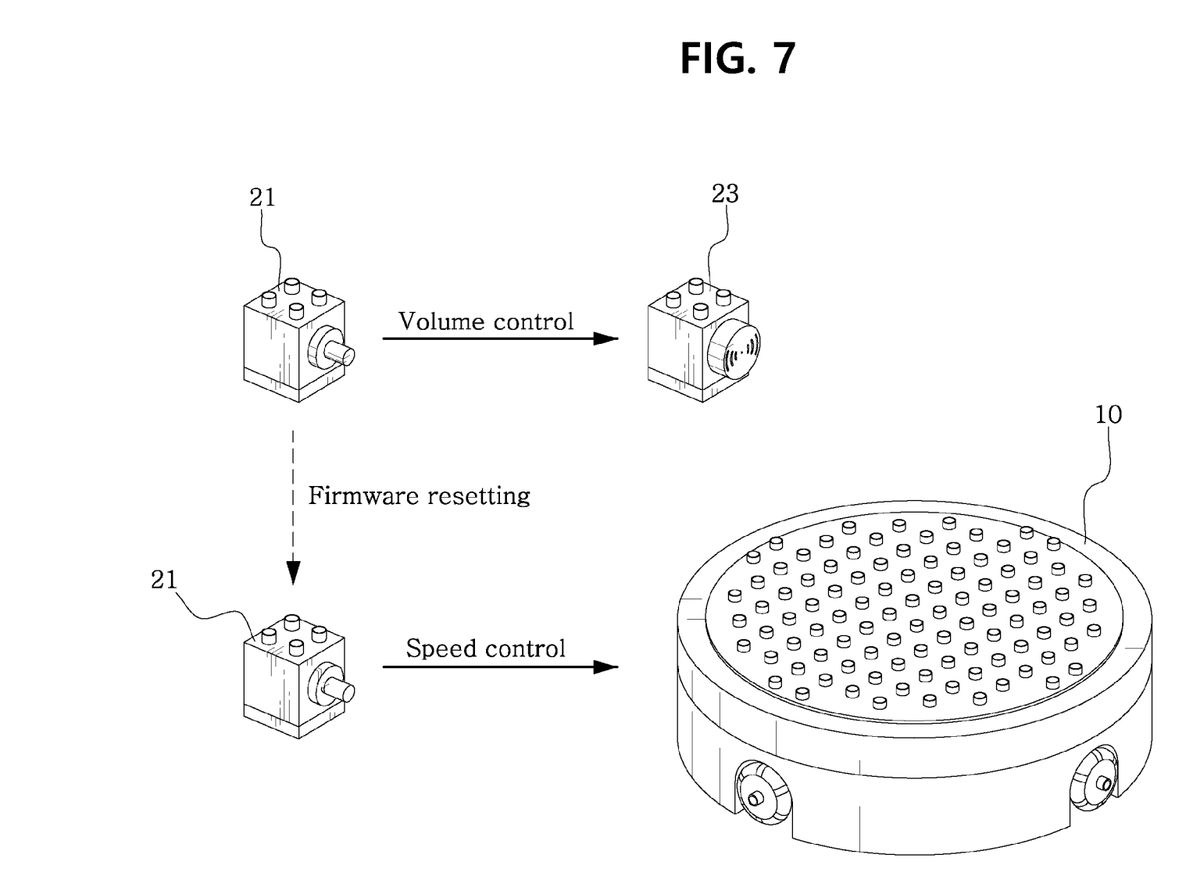
FIG. 7 shows that a different function is implemented by the firmware resetting of a function block according to an embodiment.

FIG. 7 shows that a different function is implemented by the firmware resetting of the function block according to an embodiment. In FIG. 7, the control function block 21 is set to control the volume of the speaker provided in the output function block 23 by rotating the regulator. The user may wirelessly access the control function block 21 through the terminal such as a computer or a smartphone and alter the function of the block, and accordingly the control function block 21 is set to control the movement speed (in detail, the rotational speed of the motor coupled to the driving units) of the robot platform 10 by rotating the regulator. When the user arbitrarily alters or resets the firmware of each block, even the same block may be configured to perform a different function.

Figure 8:
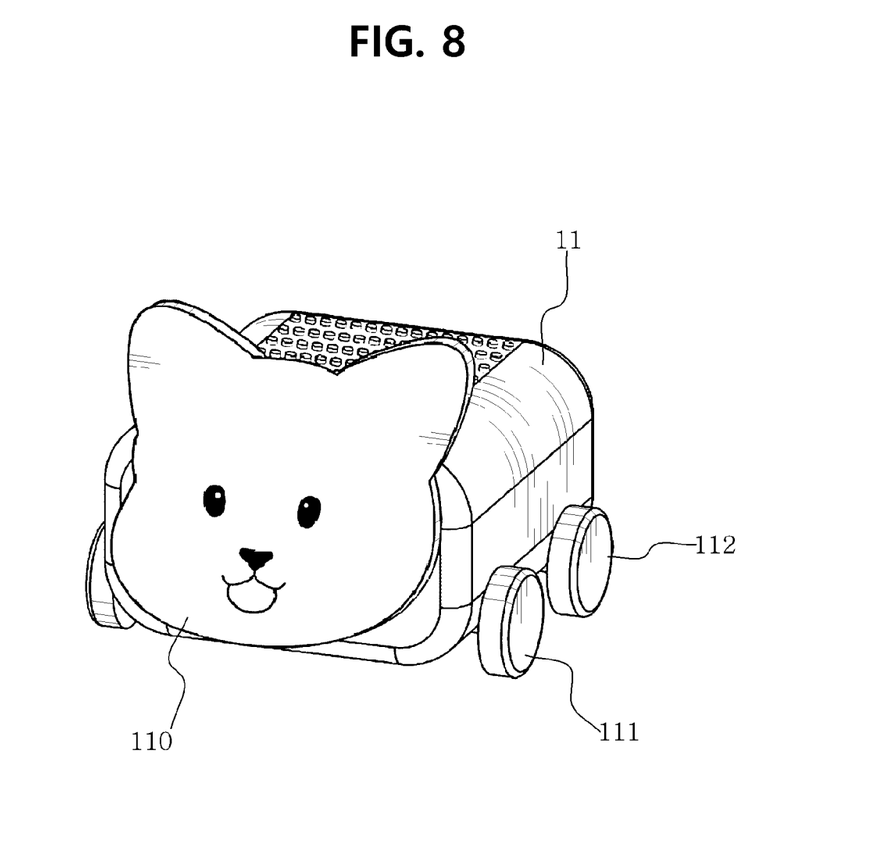
FIG. 8 shows that an outer case of a robot platform according to an embodiment is arbitrarily changed by a user.

FIG. 8 shows that a case of the robot platform according to an embodiment is arbitrarily changed by the user. As shown in FIG. 8, the user may use the robot platform 11 having a different shape from the robot platform 10 shown in FIGS. 1 and 2, and may implement the robot of an arbitrary shape by assembling additional exterior components 110, 111, 112. FIG. 8 shows an example of shape change, and robots of various shapes may be implemented using the user's desired robot platform case and components.

The programs for implementing the functions of the robot platform and each function block and programs that run on the terminal to control them may be implemented in the form of applications or program commands that can be executed through a variety of computer components, and recorded in computer-readable recording media. The computer-readable recording media may include program commands, data files and data structures, alone or in combination.

Examples of the computer-readable recording media include hardware devices designed to store and execute the program commands, for example, magnetic media such as hard disk, floppy disk and magnetic tape, optical media such as CD-ROM and DVD, magneto-optical media such as floptical disk, and ROM, RAM and flash memory.

Examples of the program commands include machine code generated by a compiler as well as high-level language code that can be executed by a computer using an interpreter. The hardware device may be configured to act as one or more software modules to perform the processing according to the present disclosure, and vice versa.

According to the module-type robot and its control system as described above, the user may implement a customized robot by freely coupling or decoupling the function blocks that perform specific functions to/from the robot platform. The function blocks according to an embodiment may perform an operation by the execution of the stored firmware, and the firmware may be arbitrarily altered or reset by the user, so even the same block may implement a variety of functions. According to an embodiment, there is provided the module-type robot control system which remotely controls the module-type robot through the terminal, for example, a smartphone, or receives data from the robot and plays related content on the terminal. It is possible to easily control the robot or receive more diverse customized contents by connection between the smart device and the module-type robot system.

While the present disclosure has been hereinabove described with reference to the embodiments, those skilled in the art will understand that various modifications and changes may be made thereto without departing from the spirit and scope of the present disclosure defined in the appended claims.

What is claimed is:

1. A module-type robot control system, comprising:
a robot platform including a driving unit which is driven by a control signal;
at least one function block which is assemblable and disassemblable on the robot platform and configured to perform a specific function; and
a user terminal capable of wirelessly communicating with the robot platform and the at least one function block, wherein each function block includes:
a power source unit for receiving power;
a wireless communication unit for wirelessly communicating with an external device, the external device comprising another function block; and
a storage unit to store firmware for performing the specific function;
a control function block configured to transmit the control signal to the external device responsive to a user's manipulation of an input unit of the control function block, the input unit comprising at least one of a switch, a regulator, a dial, a microphone, and a touchscreen; and
an output function block configured to perform an output function according to the control signal received from the external device.

2. The module-type robot control system according to claim 1, wherein the input unit generates an input signal by the user's manipulation, and the control function block is configured to generate the control signal for driving the driving unit of the robot platform or controlling the operation of the output function block according to the input signal, and transmit the control signal to the robot platform or the output function block through the wireless communication unit.

3. The module-type robot control system according to claim 1, wherein the output function block includes an output unit including at least one output device of a light-emitting diode, a speaker, or a display, and
the output function block is configured to receive the control signal from the control function block or the user terminal and operate the output device.

4. The module-type robot control system according to claim 1, wherein the user terminal is configured to receive information associated with the robot platform or the at least one function block from the robot platform or the at least one function block, and
the user terminal includes a display, and is configured to output the received information onto the display.

5. The module-type robot control system according to claim 4, wherein the information received by the user terminal includes information associated with an assembly structure or a task status of the robot platform and the at least one function block, and
the user terminal is configured to output content related to the information onto the display.

6. The module-type robot control system according to claim 5, wherein the user terminal is configured to provide to user customized content by combining the received information with pre-stored user information.

7. The module-type robot control system according to claim 1, wherein the firmware for performing the specific function of each respective function block is altered to perform a function that is different from the specific function.

8. The module-type robot control system according to claim 1, wherein a shape of the robot platform is changed according to an assembly of a case of the robot platform body and an additional exterior component.

* * * * *